(12) United States Patent
Ishida et al.

(10) Patent No.: US 9,027,991 B2
(45) Date of Patent: May 12, 2015

(54) RACING BUCKET SEAT AND COOLING SYSTEM FOR RACING CAR WITH THE SAME

(75) Inventors: Hisashi Ishida, Shinagawa-ku (JP);
Yutaka Suzuki, Shinagawa-ku (JP);
Daisuke Takezaki, Shinagawa-ku (JP);
Shohei Ezaki, Shinagawa-ku (JP)

(73) Assignee: Nissan Motorsports International Co., Ltd., Tokyo (JP)

( * ) Notice: Subject to any disclaimer, the term of this patent is extended or adjusted under 35 U.S.C. 154(b) by 108 days.

(21) Appl. No.: 13/520,437

(22) PCT Filed: Jan. 8, 2010

(86) PCT No.: PCT/JP2010/050132
§ 371 (c)(1),
(2), (4) Date: Jul. 3, 2012

(87) PCT Pub. No.: WO2011/083579
PCT Pub. Date: Jul. 14, 2011

(65) Prior Publication Data
US 2013/0069399 A1 Mar. 21, 2013

(51) Int. Cl.
*A47C 7/74* (2006.01)
*B60N 2/56* (2006.01)
*B60N 2/68* (2006.01)
*B60N 2/24* (2006.01)

(52) U.S. Cl.
CPC .............. *A47C 7/744* (2013.01); *B60N 2/5635* (2013.01); *B60N 2/5657* (2013.01); *B60N 2/5692* (2013.01); *B60N 2/686* (2013.01); *A47C 7/742* (2013.01); *B60N 2/24* (2013.01)

(58) Field of Classification Search
USPC .......................... 297/180.13, 180.14, 452.46
See application file for complete search history.

(56) References Cited

U.S. PATENT DOCUMENTS

| 3,137,523 | A | * | 6/1964 | Karner .................... 297/180.13 |
| 4,923,248 | A | * | 5/1990 | Feher ...................... 297/180.11 |
| 5,002,336 | A | * | 3/1991 | Feher ...................... 297/180.13 |
| H902 | H | * | 4/1991 | Rousseau ......................... 2/414 |
| 5,146,757 | A | * | 9/1992 | Dearing ........................... 62/61 |
| 5,353,605 | A | * | 10/1994 | Naaman ...................... 62/259.3 |
| 5,921,467 | A | * | 7/1999 | Larson ..................... 237/12.3 C |
| 2003/0102699 | A1 | * | 6/2003 | Aoki et al. ............... 297/180.14 |

(Continued)

FOREIGN PATENT DOCUMENTS

FR 2694527 A1 * 2/1994 .............. B60N 2/00
JP 2003-299551 10/2003

(Continued)

OTHER PUBLICATIONS

International Search Report issued Apr. 6, 2010 in International (PCT) Application No. PCT/JP2010/050132.

*Primary Examiner* — David E Allred
(74) *Attorney, Agent, or Firm* — Wenderoth, Lind & Ponack, L.L.P.

(57) ABSTRACT

A racing bucket seat and a cooling system for racing cars is capable of effectively suppressing the rise of a driver's body temperature, meeting safety regulations. The racing bucket seat includes a plurality of shell through holes formed in a seat shell, an outer shell fixed on the seat shell to cover the shell through holes from a rear side of the seat shell and formed with a layer-like flow passage between the outer shell and a rear surface of the seat shell, and an air intake port introducing the air into the flow passage.

21 Claims, 8 Drawing Sheets

(56) References Cited

U.S. PATENT DOCUMENTS

2004/0113468 A1* 6/2004 Swanson et al. ......... 297/180.13
2006/0175877 A1* 8/2006 Alionte et al. ........... 297/180.14
2011/0260509 A1* 10/2011 Siu .......................... 297/180.14

FOREIGN PATENT DOCUMENTS

| JP | 2007-143835 | 6/2007 |
| JP | 2008-125963 | 6/2008 |
| WO | 2008/062295 | 5/2008 |

* cited by examiner

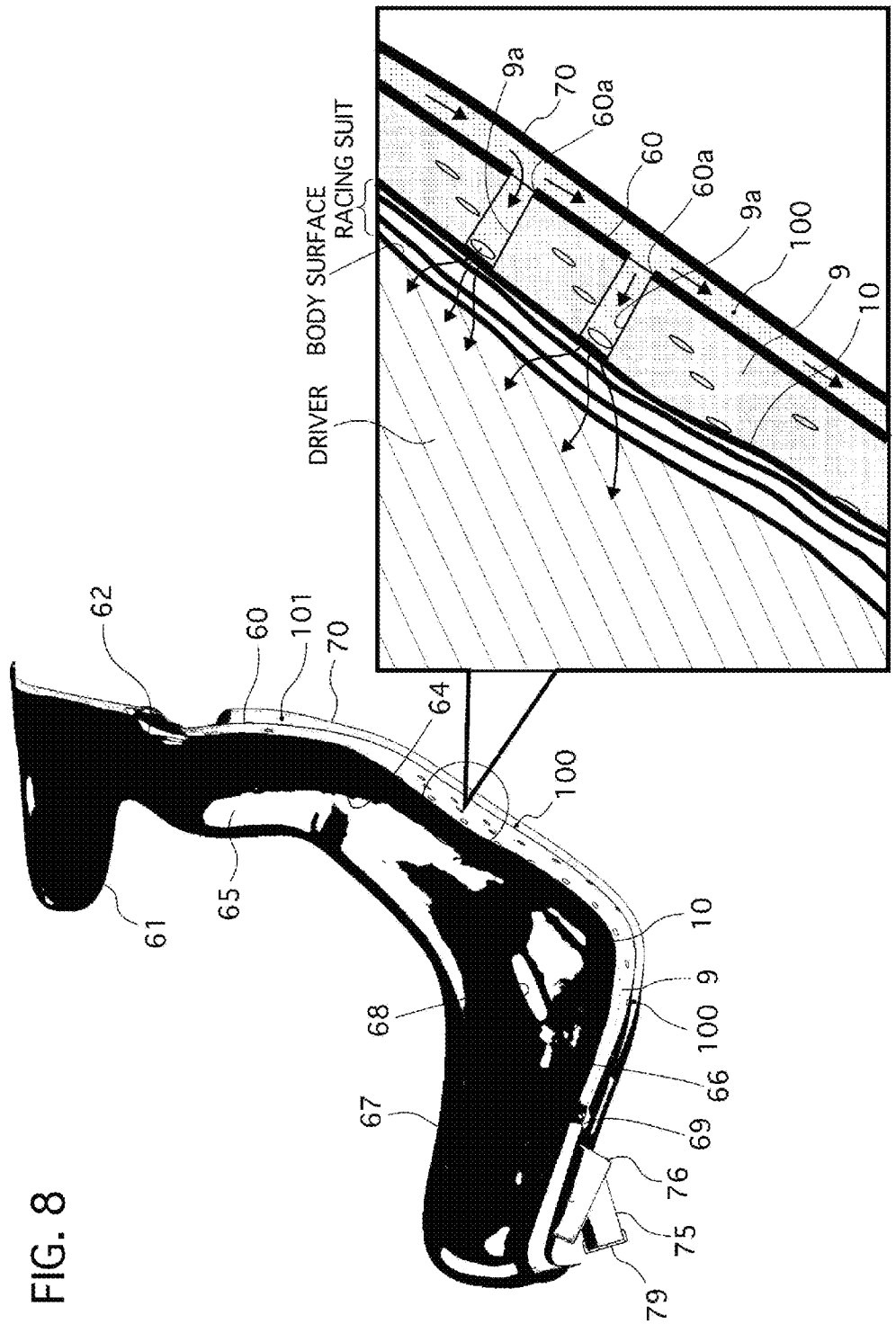

RACING BUCKET SEAT AND COOLING SYSTEM FOR RACING CAR WITH THE SAME

TECHNICAL FIELD

The present invention relates to a racing bucket seat, and more particularly to a racing bucket seat that is capable of cooling a driver and a cooling system for a racing car with the racing bucket seat.

BACKGROUND

A conventional seat capable of cooling a driver is disclosed in Japanese Patent Application Laid-Open Publication No. 2003-299551.

This seat of a passenger car is provided with a plurality of air ejection ports in a seating surface part and a backrest part, and an air conditioning device arranged under the seating surface part to supply the air ejection ports with cooling air to cool a driver.

SUMMARY

Problem(s) to be Solved

Hereinafter, racing cars, which differ greatly in specifications from general cars, will be explained.

In racing cars, one is obligated to reinforce the vehicle body by using a roll cage in order to meet the various safety regulations, and the weight of the vehicle is always attempted to be decreased. The combustible soundproof material, insulating material and the like are removed in view of fire-safety and weight savings.

Consequently, heat from an engine compartment produces a temperature increase of the vehicle body, and the temperature in a closed passenger compartment rises due to the heat from the engine compartment and insolation. A driver is also obliged to put on a helmet and a twofold or threefold fire suit, so that the body temperature rises to nearly 40° C. and the humidity in the suit goes up to 100%. In other words, a driver's environment becomes a state beyond all imagination, and consequently there is a case where a serious safety issue due to heat stroke and so on occurs during a race.

In order to reduce these issues, a countermeasures-against-heat system, which is called a cool suit system, is adopted in current racing. The cool suit system includes a jacket and a cool box. The jacket is interwoven with a flexible hose with the inner diameter of 2-3 mm, and the cool box has a heat exchanger containing ice and dry ice, and a pump.

The cooling water cooled by the heat exchanger circulates through the hose using the pump, and the jacket directly contacts with a driver's body to cool him.

However, its reliability is not sufficient because of the frequent occurrence of problems such as hose crush, pump malfunction and arrest of cooling-water circulation due to frosting of the overcooled cooling water and so on.

In addition, one of the important heat-stroke countermeasures is to decrease the humidity of the driver, because he or she cannot sweat to decrease his body temperature in high humidity. It is difficult to sufficiently decrease his body temperature because the humidity cannot be decreased, although his sweat is cooled, and consequently the driver cannot sweat.

Further, the racing cars employ a bucket seat having an integral shell structure to ensure necessary strength, holding the driver tightly, while passenger cars employ a reclining seat having a frame and a thick cushion member.

The bucket seat includes a seat shell and a thin cushion member and surface material. The seat shell has a seat part and a backrest part, which are formed as one unit by using special material such as carbon material and Kevlar material. The cushion member is arranged at a driver's side of the surface of the seat shell, and the surface material covers the cushion member. Only seats which satisfy the safety regulations of FIA (Federation Internationale de l'Automobile) can be used in racing.

Thus, in view of the objects to effectively cool the driver by using air and to ensure the strength of the seat shell, bucket seats which meet the safety regulations have been considered to have a construction where the plurality of hoses and the like are provided in the thin cushion member, the surface material is formed with holes, and these hoses are connected with hose openings supply the air to the driver.

Allowing for the safety regulations, it is difficult to remodel the seat shell, which highly relates to the safety regulations, particularly in strength. In the above-described type, the seat itself does not need to be remodeled in a case where only the cushion member is processed.

However, the thickness the cushion member of the bucket seat is much thinner than those of the cushion members of the seats used for passenger cars, so that the diameters of the hoses arranged in the cushion member are limited.

Consequently, the air resistances become very large when the air flows in the pipes having the limited diameters.

In addition, there is a problem in that the hoses themselves are crushed when the weight of the driver acts on them because the horses are arranged in the interior of the bucket seat and accordingly the air resistances become much larger.

In order to supply a certain amount of the air to overcome the air resistances, a quite large air pump and others are required, so that it is very difficult to adapt them to the racing cars, which require the weight savings.

The object of the present invention is to provide a racing bucket seat and a cooling system for a racing car that can effectively suppress the temperature rise of a racing driver, meeting the safety regulations.

Means for Solving the Problems

In order to achieve the object, in the present invention, a racing bucket seat has a plurality of shell through holes formed in a seat shell, an outer shell fixed to the seat shell, covering the shell through holes from a rear surface side of the seat shell, and formed with a flow passage that is formed along a rear surface of the seat shell and between a rear surface and the seat shell and the outer shell, and an air intake port to introduce the air in the flow passage.

Effect of the Invention

In the present invention, the seat shell of the racing bucket seat is formed with the through holes, and the flow passage communicating with the through holes are formed in the outer shell.

Therefore, the flow passage does not crush even when the driver sits on the seat, and the air can be effectively ejected.

In addition, the flow passage is formed by using a space between the seat shell and the outer shell, and therefore the flow sectional area can be ensured compared to those of the hoses and others, and consequently the flow resistance can be lowered.

Further, the outer shell is fixed to the seat shell, and therefore the seat shell can have a twofold structure, thereby ensuring a sufficient strength.

BRIEF DESCRIPTION OF THE DRAWINGS

FIG. 8 is a partially enlarged cross-sectional view showing the racing bucket seat of the first embodiment.

Figure 1:
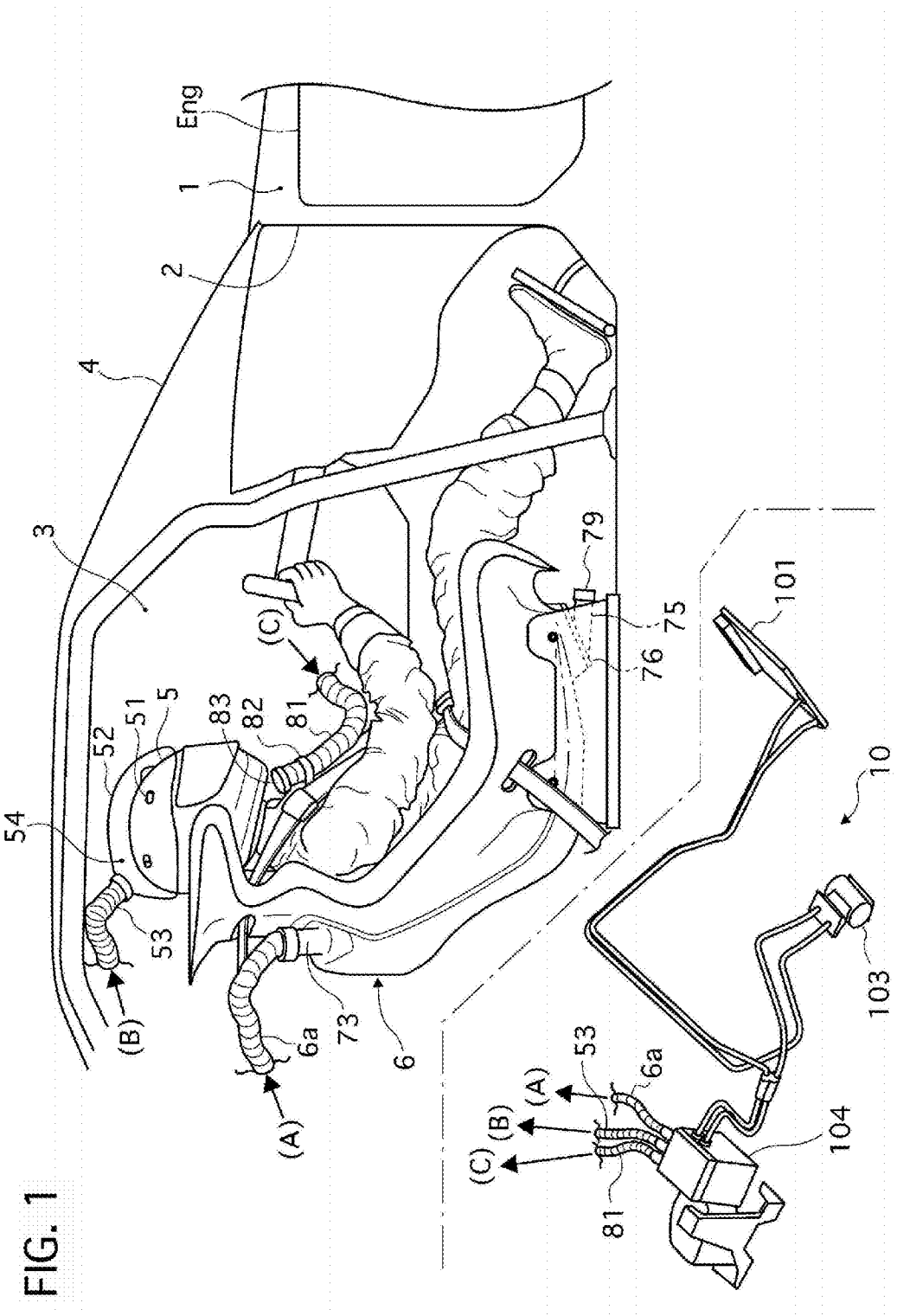
FIG. 1 is a schematic view showing a cooling system for a racing car of a first embodiment according to the present invention.
Figure 2:
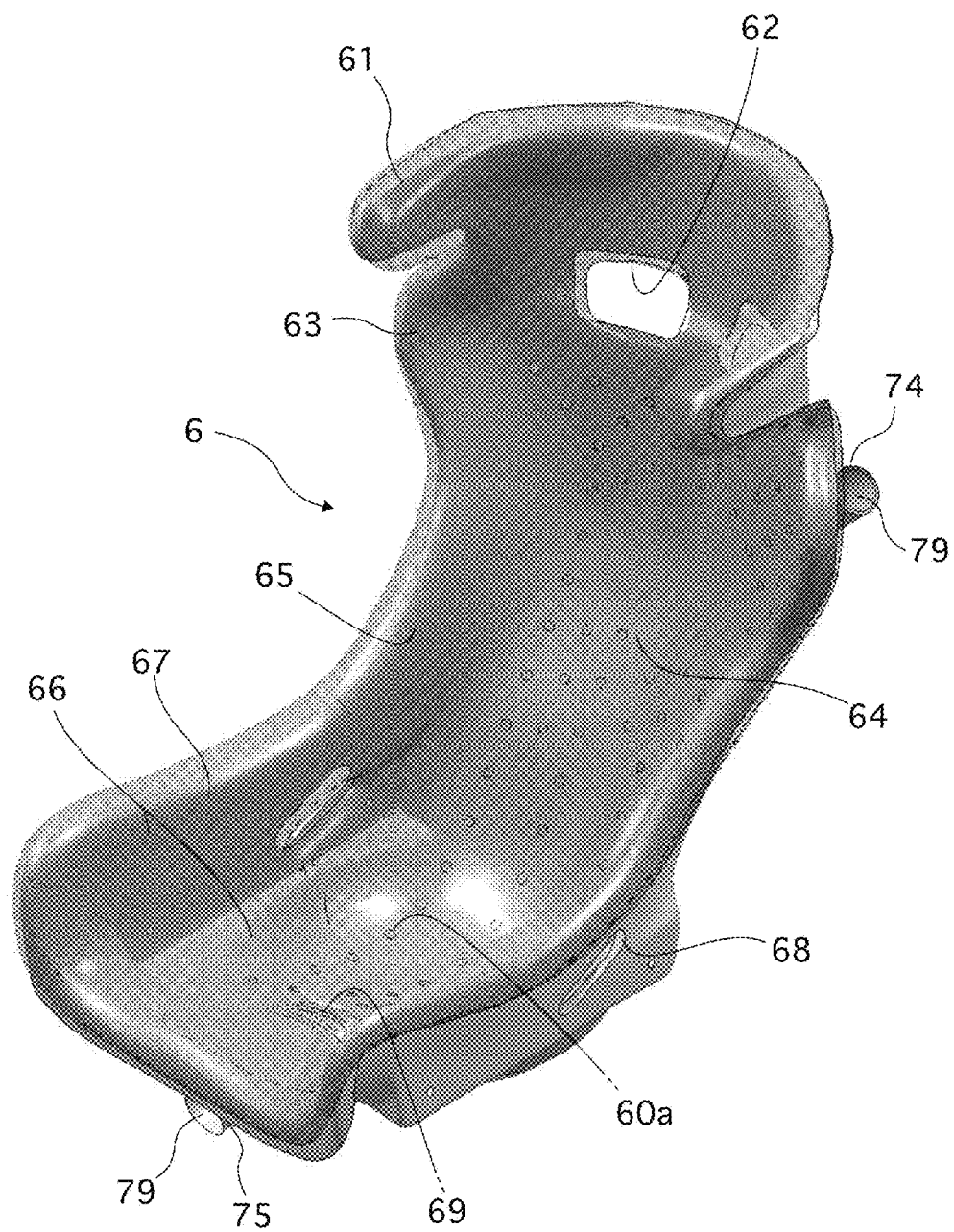
FIG. 2 is a perspective view showing a front side of a racing bucket seat of the first embodiment.
Figure 3:
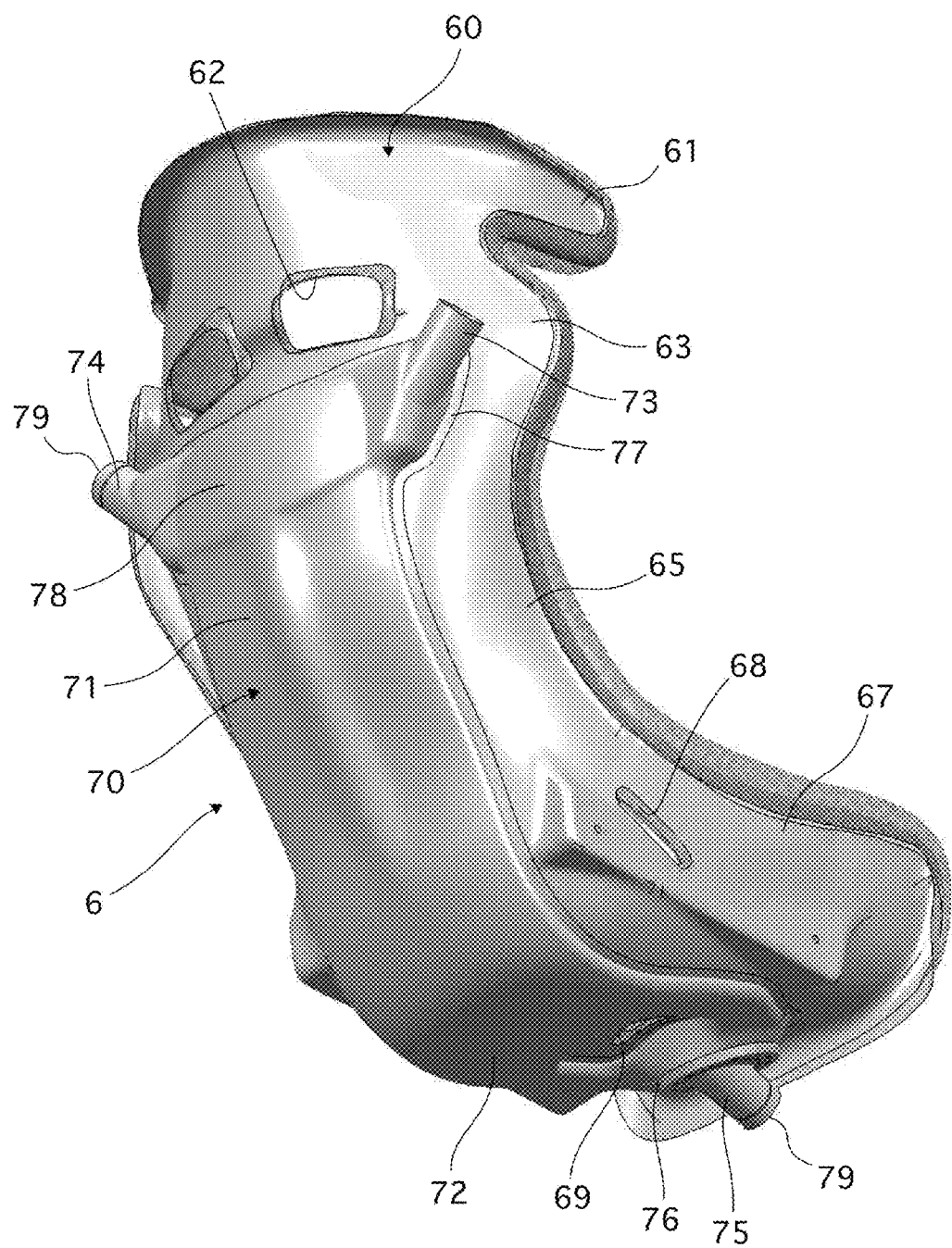
FIG. 3 is a perspective view showing a rear side of the racing bucket seat of the first embodiment.
Figure 4:
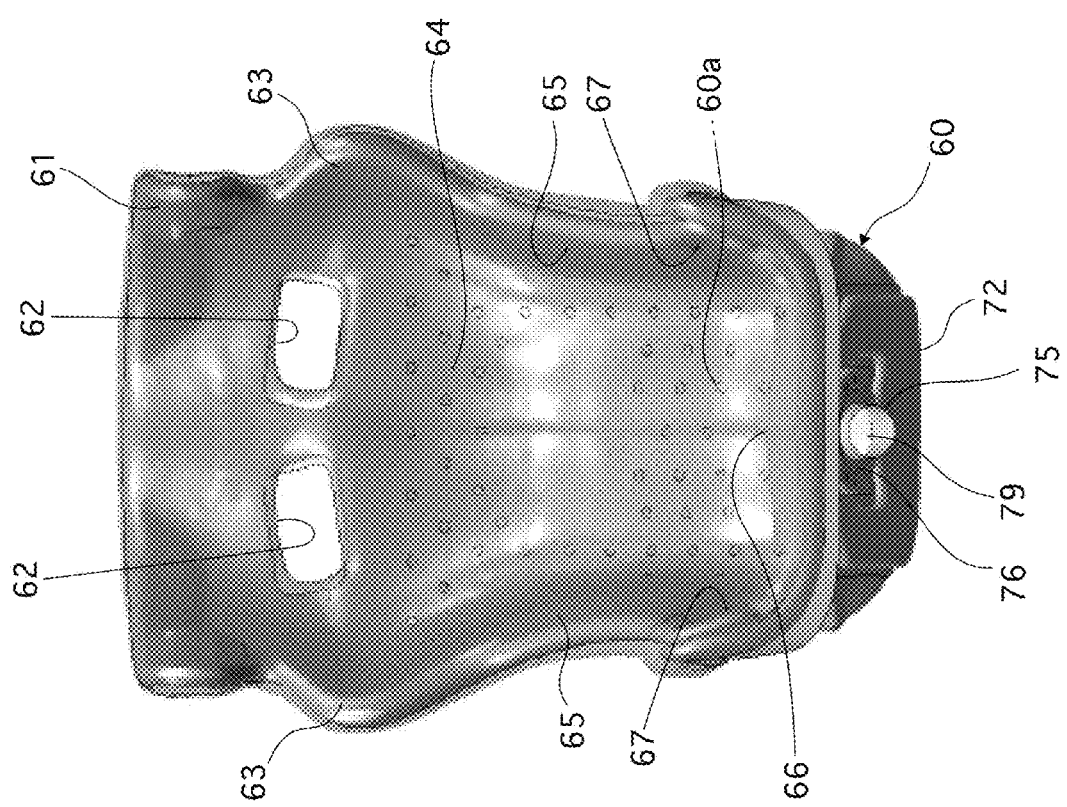
FIG. 4 is a front view showing the racing bucket seat of the first embodiment.
Figure 5:
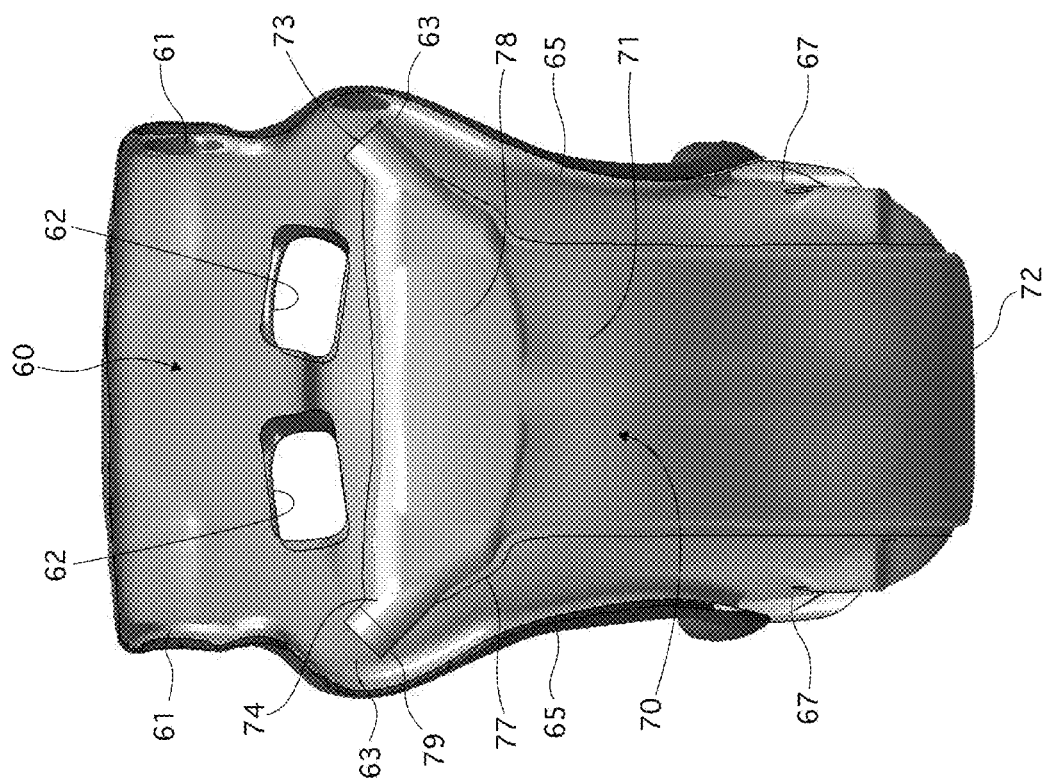
FIG. 5 is a rear view showing the racing bucket seat of the first embodiment.
Figure 6:
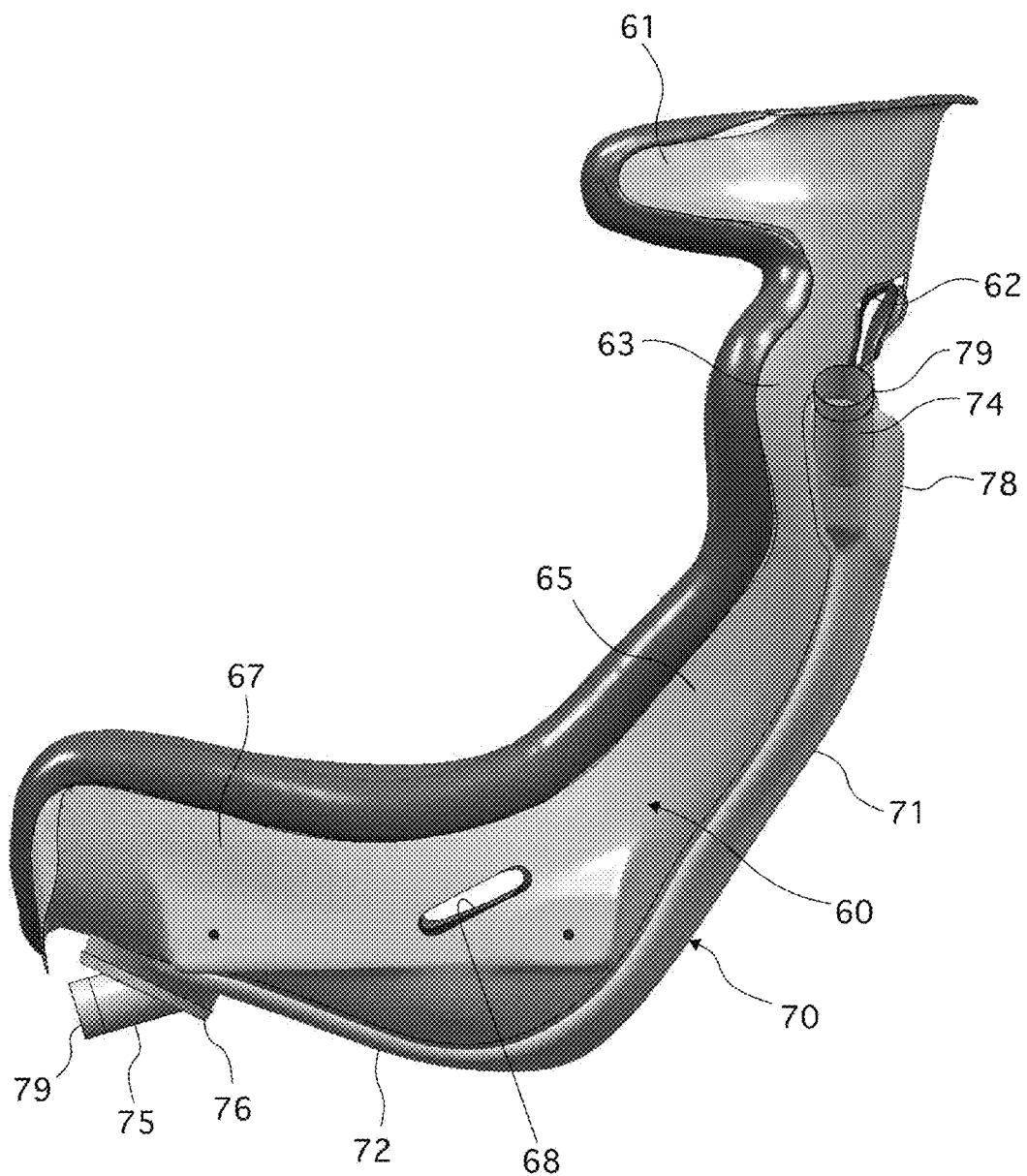
FIG. 6 is a right side view showing the racing bucket seat of the first embodiment.
Figure 7:
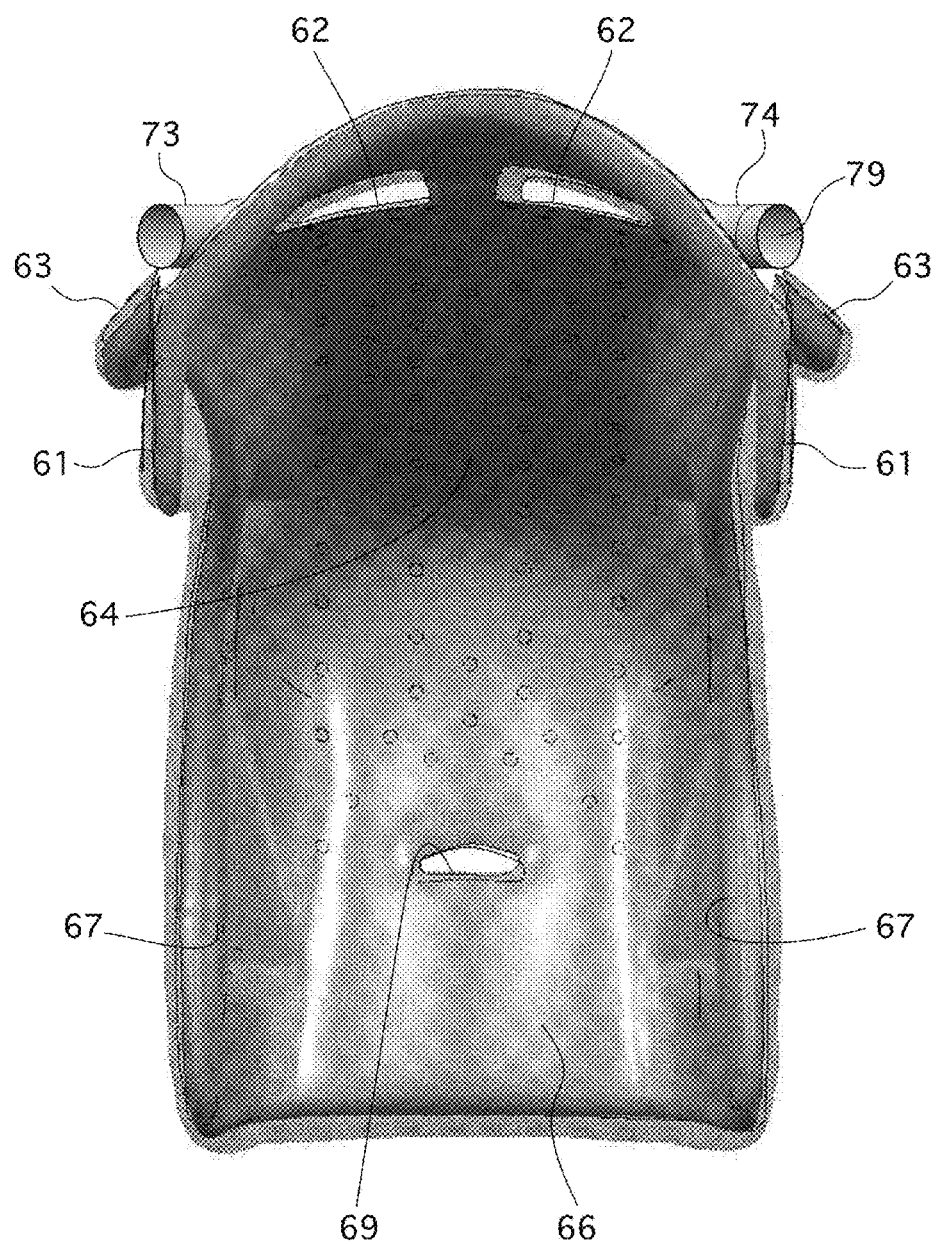
FIG. 7 is a plain view showing the racing bucket seat of the first embodiment.

DESCRIPTION OF REFERENCE NUMBERS 1 engine compartment
2 dashboard panel
3 passenger compartment
4 window shield
5 helmet
6 racing bucket seat
6a hose
9 cushion member
9a cushion-member through hole
10 surface member
51 air inlet port
52 cooling cover
53 hose
54 cooling air space
60 seat shell
60a shell through hole
64 backrest part
66 seating surface part
70 outer shell
73, 74 upper side air intake port
75 lower side air intake port
79 cap member
81 hose
82 band
100 flow passage
A first supply port
B second supply port
C third supply port

DETAILED DESCRIPTION

Hereinafter, an embodiment of the present invention will be described with reference to the accompanying drawings.

First Embodiment

Structure of Racing Car

FIG. 1 is a schematic view showing a cooling system for a racing car of the first embodiment. Incidentally, FIG. 1 is the view schematically shown so that the interior of the racing car can be easily understood, and the description of its details is omitted.

At the front side of the racing car, an engine compartment 1 is provided, and an internal combustion engine Eng is mounted. Incidentally, although the Engine Eng is arranged at the front side of a driver in the first embodiment, the arrangement of the engine is not limited, and accordingly the engine Eng may be mounted at the rear side of the driver. The output of the engine Eng is transmitted to drive wheels through a not-shown transmission and others. A dashboard panel 2 divides the engine compartment 1 and a passenger compartment 3 of the racing car. Soundproofing material, insulating material and so on are attached on the dashboard panel 2 in general passenger cars, while all of the soundproofing material and the insulating material are detached therefrom in racing cars from viewpoints of fire safety and weight savings.

Accordingly, in the racing cars, the heat in the engine compartment 1 is easily transmittable to the passenger compartment 3. Consequently, the temperature in the closed passenger compartment 3 goes up beyond 60° C. due to the heat from the engine compartment 1 and the sunlight through the window shield 4.

<Cooling System for the Racing Car>
<Air Conditioner>

An air conditioner is mounted on the racing car. The air conditioner includes a condenser 101, a compressor 103 and a cooling unit 104, having a well-known structure for cooling the air to supply it as the cooling air.

In a case of the first embodiment, the cooling unit 104 is arranged on a floor surface at an assistant driver's seat side in the passenger compartment 3. The condenser 101 is mounted at a low position, namely on the floor surface at a rear side of a vehicle body, and it introduces the cooling air through an upper surface of a trunk to cool. The compressor 103 is driven by power taken out of a not-shown drive shaft through pulleys. Incidentally, the power may be directly taken out of the engine Eng, and its manners are not limited.

In the racing car of the first embodiment, the temperature in the passenger compartment 3 goes up beyond 60° C. during racing, so that it needs a very large air conditioner in order to cool the whole passenger compartment 3.

In this case, the air conditioner causes an increase in weight in itself and it needs larger drive power to drive a large compressor. This causes the deterioration in running performance. However, the air conditioner is constructed to cool only particular parts/portions in the first embodiment, so that it can employ a smaller capacity air conditioner.

The condenser 101 of the first embodiment is a parallel flow type one with a liquid tank. The necessary power of the condenser 101 is approximately 6.9 kw at the maximum value, and approximately 3.2 kw at the practical value when the racing car with the compressor runs at 150 km/h. The compressor 103 employs a concentric rotor type one with five vanes to discharge 63 cc/rev, being controlled by using a magnetic clutch. The compressor 103 needs approximately 3.3 kw (4.5 ps) at the maximum value and approximately 1.5 kw (2.0 ps) at the practical value.

The cooling unit 104 employs a centrifugal air blower (200w) with approximately 3.8 kw at the maximum value and approximately 1.7 kw at the practical value.

Incidentally, in a case where the air conditioner of the first embodiment supplies the cooling air to the passenger compartment 3 like those of general passenger cars, the temperature in the passenger compartment goes down only by 5° C., and accordingly a burden upon the driver cannot be reduced when it is used in a normal way.

The cooling unit 104 is formed with three cooling-air supply ports for supplying the cooling air; a first supply port (A), a second supply port (B) and a third supply port (C). The racing bucket seat 6 is connected with the first supply port (A)

through a hose 6a, and the cooling air is supplied through a contact surface of the racing bucket seat 6 between the racing bucket seat 6 and the driver.

The detail of the racing bucket seat 6 will be later described.

<Air Supply to the Helmet>

The helmet 5 is formed with a plurality of air intake ports 51 to communicate between the open air and the interior of the helmet 5. A cooling cover 52 surrounds the plurality of air intake ports 51 of the helmet 5, and it is attached to the helmet 5 to form a cooling air space 54 at the upper side of the helmet 5.

The cooling cover 52 is constructed in such a way that it is fit to the upper portion of the helmet 5 from the exterior of the helmet 5, being easily attachable to and detachable from the helmet 5. The cooling cover 52 is connected with the second port (B) through a hose 53, and the cooling air is supplied to the interior of the cooling air space 54. Thus, the cooling air is introduced to the air intake ports 51 from the cooling intake space 54, thereby decreasing the temperature and the humidity in the helmet 5.

<Air Supply to Neck Region>

A hose 81 connected with the third supply port (C) is attached to a chest region of the driver. The hose 81 is fixed by using a band 82 provided with a racing suit.

An aperture 83 of the hose 81 is attached under the helmet 5 so that the cooling air can be supplied to a clearance between a neck region of the driver and the interior of the helmet 5. Thus, the cooling air is sent to his or her face and neck at the center of a mouth of the driver. To cool the neck is to cool a portion where blood actively flows, and accordingly it is effective to decrease the body temperature. Beyond that, it brings a very remarkable cooling effect because the driver intakes the cooling air by breathing That is, the cooling air taken in by breathing cools a mouth cavity and a nose cavity to directly cool the vicinity of a central nerve in the brain, and to introduce the cooling air in his or her lungs further provides a cooling effect to cool from the interior of the body.

<Cooling Air Supply to the Racing Bucket Seat>

Construction of the Racing Bucket Seat:

Next, the supply of the cooling air to the racing bucket seat will be described.

FIGS. 2 to 8 are views showing a construction of the racing bucket seat of the first embodiment.

The racing bucket seat 6 includes a seat shell 60 forming a fundamental framework of the seat, a cushion member 9 (shown in FIG. 8) arranged at a driver's seating surface side of the seat shell 60, and a surface material 10 covering the whole of the cushion member 9 from its surface, being formed of carbon material as one unit.

The cushion member 9 is used to contact the sterically formed seat shell 60 with the driver without a gap therebetween, using a low repulsion material such as sponge.

The surface material 10 uses excellent-breathing cloth material.

The seat shell 60 is formed with neck support portions 61 to prevent the helmet 5 from moving too much in order to decrease the burden upon the driver's neck due to lateral acceleration caused during car turning. The neck support portions 61 are formed to project from the both sides of the upper portion of the seat shell in a forward direction of the car. The lower portion of the neck support portions 61 is formed with shoulder support portions 63 projecting in a diagonally forward direction to prevent the driver's shoulders from moving too much.

Lumbar support portions 65 are formed at the sides of the backrest part 64 and under the shoulder support portions 63.

A leg support portion 67 is continuously formed between the lumbar support portions 65, projecting in an upward direction.

Left and right seat-belt through holes 62 are formed to let shoulder belts of a five point seat belt through at the approximately same height as that of the shoulder support portions 63.

Left and right through holes 68 are formed to let lumbar belts of the five point seat belt through at the rear side of the leg support portion 67.

A through hole 69 is formed in a front middle portion so that a center belt can penetrate through the through hole 69 to pull the shoulder belts and the lumbar belts in a downward direction.

A plurality of shell through holes 60a with the diameter of 10 mm are provided to penetrate through the seat shell 60 in an area from the vicinity under the seat-belt through holes 62 of the backrest part 64 to the vicinity near the seat-belt through holes 69 of the seating surface part 66. In the first embodiment, eighty-four shell through holes 60a are formed in total.

At the positions of the cushion member 9 corresponding to the shell through holes 60a, cushion-member through holes 9a are provided to form air ejection ports penetrating through the cushion member 9 and the seat shell 60.

Incidentally, as the surface material itself allows air to breath easily, no through hole is formed in the surface material 10, which covers the surfaces of the air ejection ports. Thus, the surface material 10 functions as a filter, preventing contaminants from falling into the flow passage 100. However, the surface material 10 may have through holes in order to improve its cooling performance.

An outer shell 70 is fixed to the rear surface side of the seat shell 60 to cover the shell through holes 60a and form a layer-like flow passage 100 with a thickness of 10-15 mm between the rear surface of the seat shell 60 and the outer shell 70.

The outer shell 70 has the backrest part and the seating surface part, which are formed as one unit by using carbon material as the same as that of the seat shell 60. The outer shell 70 has a flange portion 77 formed with an adhesive surface to be fixed to the rear surface of the seat shell 60 all along the outer circumference thereof. The flange portion 77 and the rear surface of the seat shell 60 adhere with each other without a gap therebetween.

The outer shell 70 includes an outer backrest part 71, an outer seating surface part 72, an upper side chamber 78 and a lower side chamber 76. The outer backrest part 71 covers the shell through holes 60a formed in the back rest part 64 from the rear side. The outer seating surface part 72 covers the shell through holes 60a formed in the seating surface part 66. The upper side chamber 78 is formed at the upper side end portion of the layer-like flow passage 100, and the lower side chamber 76 is formed at the lower side end portion of the layer-like flow passage 100.

The outer backrest part 71 extends in an upward and downward direction with a width of approximately 250-300 mm, and the layer-like flow passage 100 with the thickness of 10-15 mm is formed along the rear surface configuration of the seat shell 60.

The outer seating surface part 72 is formed continuously from the outer backrest part 71, extending in parallel to the seating surface part 66 of the seat shell 60 in a forward and backward direction, and the layer-like flow passage 100 with a predetermined thickness is formed along the rear surface configuration of the seat shell 60. The flow passage 100 is connected with the lower side chamber 76, bypassing the seat-belt through holes 69.

The upper side chamber 78 is formed between the outer backrest part 71 and the seat-belt through holes 62, extending in a direction of the left and right shoulder support portions 63 and forming a flow passage 101 having the flow passage area larger than that of the layer-like flow passage 100.

In the upper side chamber 78, upper side air intake ports 73 and 74 shaped like a cylinder with the diameter of approximately 40-50 mm are formed at the bilaterally symmetric positions. The upper side air intake ports 73 and 74 open in an obliquely upward direction, so that the intake air is effectively introduced into the upper side chamber 78.

The lower side chamber 76 is shaped like a cylinder, being formed on the outer seating surface part 72 at the front end portion side relative to the seat-belt through holes 69.

The lower side chamber 76 is formed with the lower side air intake port 75 having a flexion angle relative to the cylindrical axis of the lower side chamber 76 and having the diameter of approximately 40-50 mm. The lower side air intake port 75 is attached to the lower side chamber 76 to be rotatable through 380 degrees relative to the lower side chamber 76, so that the direction of the hose 6a can be easily changed when it is handled.

The provision of the plurality of air intake ports, the upper side air intake ports 73, 74 and the lower side air intake port 75, makes effective use of different piping spaces among specifications of the racing cars, and accordingly its hoses can be arranged according to the situations of the cars.

Incidentally, in the first embodiment, cap members 79 are respectively attached on the upper side air intake port 74 and the lower side air intake port 75 because the cooling air is introduced only from the upper side air intake port 73 and the other ports do not introduce the cooling air.

Cooling Operation of the Racing Bucket Seat:

When the cooling air is supplied through the hose 6a, the cooling air is introduced into the upper side chamber 78 through the upper side air intake port 73. The cooling air is supplied into the layer-like flow passage 100 through the upper side chamber 78, keeping a proper supply balance.

The layer-like flow passage 100 has the flow passage area with the width beyond 250 mm and the thickness beyond 10 mm, and accordingly the flow resistance thereof is much smaller than that of long pipe with the diameter of 2-3 mm. The cooling air is supplied to the driver through the layer-like flow passage 100, the shell through holes 60a, the cushion-member through holes 9a and the surface material 10. The diameters of the shell through holes 60a and the cushion-member through holes 9a are 10 mm, and their lengths are very short, and accordingly their flow resistances are small. The through holes are formed in the seat shell itself so that the diameter of the air intake port can be larger than those of pipes and it can avoid from being crushed by the driver.

When the cooling air is supplied as explained above, the cooling air is directly supplied to the driver's racing suit as shown in an enlarged view indicated by arrows and therefore the cooling air can easily pass between the fibers of the racing suit. Thus, the cooling air can be directly supplied to the body surface of the driver.

In addition, the cooling air is supplied in the racing suit, so that the temperature and the humidity of the body surface of the driver and the temperature of the racing suit can be decreased.

In the case of arranging the cooling-air supply port at the position apart from the driver to output the cooling air, the cooling air easily spreads in the open air, and it cannot pass between the fabrics of the racing suit because it is blocked out at the surface of the racing suit. Therefore, the cooling air cannot be supplied to the interior of the fabrics of the racing suit or to the body surface of the driver, and accordingly sufficient cooling performance cannot be obtained.

<Result of Experiment>

A running test similar to actual racing was carried out by using a racing car with the cooling system of the first embodiment. As a result, a head of a driver was almost dry due to the cooling of the helmet after running. In addition, the racing bucket seat could cool not only his or her body but also his or her legs.

Although it is normal that the cushion member gets wet heavily in addition to the driver in the case of using a normal seat, the system of the first embodiment could maintain them dry.

Further, the supplying the cooling air to the neck region was capable of cooling the interior of the lungs in addition to the cooling from the driver's back side, and the front side of the driver was capable of being sufficiently cooled.

As explained above, the cooling system of the first embodiment was capable of sufficiently cooling the driver even under the severe environment, avoiding a situation where the driver could suffer from heat attack almost perfectly.

The Effects of the First Embodiment

As described above, the first embodiment can provide the effects listed below.

(1) The racing bucket seat includes the seat shell 60 having the seating surface part and the backrest part that are formed as one unit, the cushion member 9 arranged at the surface side, as the driver's seating surface side, of the seat shell 60, the surface material 10 covering the cushion member 9, the plurality of shell through holes 60a formed in the seat shell 60, the cushion-member through holes 9a formed at the positions of the cushion member 9 corresponding to the shell through holes 60a, the outer shell 70 fixed on the seat shell 60, covering the shell through holes 60a from the rear surface side of the seat shell 60 and formed with the layer-like flow passage 100 between the outer shell 70 and the rear surface of the seat shell 60, and the air intake port 73 introducing the air into the flow passage 100. Therefore, the temperature and the humidity of the body surface of the driver can be effectively decreased. In addition, the provision of the layer-like flow passage 100 can have the flow resistance much smaller than that in the case of using the pipes with a limited diameter to supply the cooling air.

Further, as the shell through holes 60a are formed in the seat shell 60, the supply ports are stable, being not crushed due to the weight of the driver. Further, the diameters of the shell through holes 60a can be set larger than those of the pipes having a limit of the diameter, and accordingly a large amount of cooling air can be supplied.

(2) In the racing bucket seat described in the above (1), the shell through holes 60a are arranged from the seating surface part 66 to the backrest part 64.

Therefore, the contact area with the driver can be widely cooled down.

Especially, the cooling air is supplied to not only an upper body but also a lower body, so that the driver can be effectively cooled.

In the racing bucket seat described in the above (1) or (2), the outer shell 70 is arranged from the seating surface part 66 to the backrest part 64.

Therefore, the driver can be cooled in a wide region.

Incidentally, the outer shell 70 is formed as one unit as shown in the first embodiment, and accordingly the number of its parts can be decreased, improving the strength of the racing bucket seat.

(4) In the racing bucket seat described in one of the above (1) to (3), the air intake ports 73, 74 and 75 are formed at the end portions of the flow passage 100.

Therefore, the introduced cooling air can be effectively supplied to the whole.

(5) In the racing bucket seat described in the above (4), the air intake ports 73, 74 and 75 are plural.

Therefore, the freedom of layout of hoses can be improved.

Incidentally, the driver can be more effectively cooled in a case where the plurality of hoses are connected with all of the air intake ports.

(6) In the racing bucket seat described in the above (5), the air intake port/ports, through which the cooling air is not introduced, of the plurality of air intake ports are closed by the cap member(s) 79.

Therefore, the cooling air can avoid from leakage from the air intake port/ports, thereby being effectively supplied to the driver.

(7) The cooling system for the racing cars of the first embodiment includes the racing bucket seat and the air conditioner. The racing bucket seat includes the seat shell 60 having the seating surface part and the backrest part that are formed as one unit, the cushion member 9 arranged at the surface side, as the driver's seating surface side, of the seat shell 60, the surface material 10 covering the cushion member 9, the plurality of shell through holes 60a formed in the seat shell 60, the cushion-member through holes 9a formed at the positions of the cushion member 9 corresponding to the shell through holes 60a, the outer shell 70 fixed on the seat shell 60, covering the shell through holes 60a from the rear surface side of the seat shell 60 and formed with the layer-like flow passage 100 between the outer shell 70 and the rear surface of the seat shell 60, and the air intake port 73 introducing the air into the flow passage 100. The air conditioner has the first supply port (A) and driven by the power unit to supply the cooling air to the air intake port 73.

Therefore, in addition to the effects described in the above (1), the cooling air can effectively cool only the portions to be cooled in a case of using a small air conditioner.

In addition, the cooling air does not spread in the passenger compartment, and accordingly the temperature and the humidity of the body surface of the driver can be effectively decreased.

(8) In the cooling system for racing cars described in the above (7), the air conditioner has the second supply port (B) for supplying the cooling air in the helmet.

Therefore, the cooling air is introduced to the air intake port 51 from the cooling air space 54, thereby decreasing the temperature and the humidity in the helmet.

(9) In the cooling system for the racing cars described in the above (7) or (8), the air conditioner has the third supply port (C) for supplying the cooling air to the mouth of the driver.

Therefore, the cooling air can cool the mouth cavity and the nose cavity of the driver through breathing, and thereby the vicinity of the central nerve in the brain can be directly cooled.

In addition, the cooling air can be supplied in the lungs to cool the interior of the body.

Other Embodiments

The first embodiment has been explained, and the present invention covers constructions other than the first embodiment.

The first embodiment employs the cooling system for racing cars using the air conditioners, while the air conditioner may be removed and the open air may be introduced to the racing bucket seat and so on, because the temperature in the passenger compartment goes up beyond 60° C. and the aggressive introduction of the open air can decrease the sensible temperature of the driver even in a racing in an area with high temperature beyond 35° C. for example.

In addition, the air passes around the body surface of the driver, thereby drying his or her sweat and cooling the body surface due to the heat of vaporization.

Further, the driver can further sweat after the sweat is dried, and accordingly the body temperature of the driver can be decreased.

The cooling system is realized by using the air conditioner to cool the racing bucket seat, the helmet and the neck part in the first embodiment, while only the racing bucket seat may be employed or the combination of some selected from them may be employed.

From the results of various experiments, we found that the racing bucket seat can cool the driver best of all of them. Accordingly, it is desirable to employ the racing bucket seat and add the other system.

The racing bucket seat is provided with eighty-four shell through holes 60a in the first embodiment, while the number of the holes 60a may be smaller than that.

In addition, the number of the holes 60a may be larger than eighty-four as long as the strength of the racing bucket seat is ensured.

Further, the diameter of the shell through holes 60a is set 10 mm in the first embodiment, while the diameter and the number of the shell through holes may be appropriately combined as long as the strength of the racing bucket seat is ensured.

In addition, the shell through holes 60a are formed in the backrest part 64 and the seating surface part 66 and they are not formed in the other part in the first embodiment, while they may be formed in the lumbar support 65 and/or the leg support part 67.

In this case, the outer shell 70 preferably covers the lumbar support 65 and/or the leg support part 67.

The seat shell and the outer shell are formed by using the same material in the first embodiment, while they may be formed by using different material.

Further, the outer shell 70 is formed from the backrest part to the seating surface part as one unit in the first embodiment, while it is not limited to the one unit. The backrest part and the seating surface part of the outer shell may be formed independently from each other, and they may be constructed in such a way that each of them is supplied with the cooling air. This improves the freedom of design.

The invention claimed is:

1. A racing bucket seat comprising:
   a seat shell having a seating surface part and a backrest part that are formed as one piece, said seat shell having formed therein a plurality of shell through holes;
   a cushion member arranged at a surface side, which functions as a driver's seating surface side, of said seat shell, said cushion member having formed therein a plurality of cushion-member through holes formed at positions of said cushion member corresponding to positions of said shell through holes;
   a surface material covering said cushion member;
   a one piece outer shell fixed on said seat shell and covering said shell through holes from a rear surface side of said seat shell in both of the seating surface part and the backrest part, said outer shell being formed with a flow passage that is formed along a rear surface of said seat shell and between said outer shell and the rear surface of said seat shell; and an air intake port through which air is introduced into said flow passage.

2. The racing bucket seat according to claim 1, wherein said shell through holes are arranged from the seating surface part to the backrest part.

3. The racing bucket seat according to claim 2, wherein said outer shell is arranged from the seating surface part to the backrest part.

4. The racing bucket seat according to claim 3, wherein said air intake port is formed at an end portion of said flow passage.

5. The racing bucket seat according to claim 4, wherein said air intake port comprises a plurality of air intake ports.

6. The racing bucket seat according to claim 5, further comprising:
a cap member blocking an air intake port, through which the air is not introduced, of said plurality of air intake ports.

7. The racing bucket seat according to claim 2, wherein said air intake port is formed at an end portion of said flow passage.

8. The racing bucket seat according to claim 7, wherein said air intake port comprises a plurality of air intake ports.

9. The racing bucket seat according to claim 8, further comprising:
a cap member blocking an air intake port, through which the air is not introduced, of said plurality of air intake ports.

10. The racing bucket seat according to claim 1, wherein said outer shell is arranged from the seating surface part to the backrest part.

11. The racing bucket seat according to claim 10, wherein said air intake port is formed at an end portion of said flow passage.

12. The racing bucket seat according to claim 11, wherein said air intake port comprises a plurality of air intake ports.

13. The racing bucket seat according to claim 12, further comprising:
a cap member blocking an air intake port, through which the air is not introduced, of said plurality of air intake ports.

14. The racing bucket seat according to claim 1, wherein said air intake port is formed at an end portion of said flow passage.

15. The racing bucket seat according to claim 14, wherein said air intake port comprises a plurality of air intake ports.

16. The racing bucket seat according to claim 15, further comprising:
a cap member blocking an air intake port, through which the air is not introduced, of said plurality of air intake ports.

17. The racing bucket seat according to claim 1, wherein the seating surface part and the backrest part are integrally formed.

18. A cooling system adapted for a racing car, the cooling system comprising:
a racing bucket seat including:
a seat shell having a seating surface part and a backrest part that are formed as one piece, said seat shell having formed therein a plurality of shell through holes;
a cushion member arranged at a surface side, which functions as a driver's seating surface side, of said seat shell, said cushion member having formed therein a plurality of cushion-member through holes formed at positions of said cushion member corresponding to positions of said shell through holes;
a surface material covering said cushion member;
a one piece outer shell fixed on said seat shell and covering said shell through holes from a rear surface side of said seat shell in both of the seating surface part and the backrest part, said outer shell being formed with a flow passage that is formed along a rear surface of said seat shell and between said outer shell and the rear surface of said seat shell; and
air intake port through which air is introduced into said flow passage; and
an air conditioner having a first supply port and driven by a power unit to supply a cooling air to said air intake port.

19. The cooling system adapted for the racing car according to claim 18, wherein
said air conditioner has a second supply port for supplying the cooling air to a cooling air space formed at an upper side of a helmet.

20. The cooling system adapted for the racing car according to claim 19, wherein
said air conditioner has a third supply port for supplying the cooling air to an interior of the helmet from under the helmet.

21. The cooling system adapted for the racing car according to claim 18, wherein
said air conditioner has a third supply port for supplying the cooling air to an interior of the helmet from under the helmet.

* * * * *